Patented Apr. 13, 1943

2,316,742

UNITED STATES PATENT OFFICE 2,316,742

CERAMIC COATING COMPOSITION

Alden J. Deyrup, Elizabeth, N. J., assignor to E. I. du Pont de Nemours & Company, Wilmington, Del., a corporation of Delaware No Drawing. Application June 5, 1941, Serial No. 396,697

19 Claims. (Cl. 106—49)

This invention relates to certain new and improved low-melting glaze or enamel compositions and their preparation. It is particularly concerned with low-melting glazes or fluxes which may be combined with ceramic pigments to produce vitrifiable coating compositions suitable for application to ceramic ware, particularly chinaware or porcelain.

Overglaze decorations have been used for many years for producing various types of decoration on completed ceramic ware such as chinaware. Ordinarily, the usual overglaze color or enamel consists of two parts, a low-melting flux or glaze composition, and a ceramic pigment. In preparing the overglaze composition, in some cases the flux and pigment are simply ground together in a ball mill or other suitable grinding mill. In other cases the pigment may be partly or completely melted into the flux during the process of preparing the overglaze color.

Overglaze colors, thus prepared, may be applied to chinaware to form decorative coatings thereon by one of several wellknown techniques. Thus, they may be applied to the chinaware, or other ceramic ware, by stamping, stenciling, spraying the color suspended in a suitable vehicle, ground laying, decalcomania, or other procedures. After the overglaze color is applied in suitable pattern to the ware, the ware is then fired, usually to a temperature within the range 600 to 800° C. At this temperature the temporary binder used for applying the color to the ceramic ware is burned away and the color fuses to some extent into the surface of the ware. The decorative coating resulting consists ordinarily of a thin layer of pigmented flux resting upon and closely bonded to the ordinary glaze coating on the ware. Only in very rare cases does the overglaze color appear to be completely fused into the base decorative glaze and, in most cases, the overglaze color is found to rest on the surface of the glaze, though firmly bonded thereto.

Various overglaze flux compositions are described in the literature. For example, in the Hainbach reference volume "Pottery Decorating," published by Scott, Greenwood & Son in 1924, there are given, on pages 152 to 154 thereof, a number of workable formulas for overglaze colors. The compositions given in this reference work are typical of the flux compositions now utilized in the art for preparing glaze colors, but unfortunately they are subject to certain inherent defects. Among the principal failings of flux compositions now available in the art for making overglaze colors is the poor resistivity of such compositions, the fluxes being readily attacked both by dilute acids and by relatively weak alkaline solutions. In many cases this poor resistivity has resulted in reduction in the useful life of the ceramic ware in service as the result of destruction of the smooth, glossy surface of the overglaze decoration.

Although poor resistivity is an outstanding disadvantage of overglaze fluxes now available to the industry, the present known compositions are also objectionable in that they seldom possess coefficients of expansion sufficiently close to that of the glaze coating underneath on which they rest and to which they are bonded. This results in strains being set up when the ceramic ware is in service, frequently causing the decorative coating to craze or to peel off. As the result of these outstanding disadvantages of the present overglaze type of decoration, its development in the art has been seriously hindered. Because of the difficulties with present known compositions of obtaining completely satisfactory products, there has been a tendency in the art away from the use of overglaze decorative coatings.

One of the objects of this invention is the preparation of overglaze colors possessing greatly improved properties. My new and improved overglaze color compositions have properties much superior to those now available in the industry.

A further object of this invention is the development of overglaze colors which will not craze, flake, or chip when fired on chinaware, even when the overglaze decoration is applied in relatively heavy layers. A further object of the invention is the development of overglaze colors for chinaware which will mature to a glossy finish at temperatures no higher than those commonly employed in the art, but which will have a vastly superior resistivity to attack when subjected to the action of dilute acids and alkalies. These and still further objects of this invention will be apparent from the ensuing disclosure of certain preferred embodiments thereof.

In the past alumina, $Al_2O_3$, has been consistently avoided as an ingredient in low-melting fluxes of the type used for decorating glassware and for overglaze compositions. While alumina has often been utilized in formulating enamels suitable for application to sheet metal surfaces, and in glass compositions and high-fire glaze compositions, it has been considered detrimental when present as a component in low-fusing fluxes or glazes. As a result alumina has not been suggested or considered as suitable for use in ceramic ware decorating compositions of the low-melting type used, for example, for decorating chinaware.

It has now been discovered that alumina, instead of being an unsatisfactory ingredient when present in low-melting flux compositions of the type used for preparing overglaze colors, possesses unusual properties when incorporated as an ingredient therein and greatly improves the characteristics of the resulting flux. I have found that when substantial amounts of alumina are present in low-fusing fluxes, particularly fluxes of the type used in preparing overglaze colors, the resulting products are superior to those known in the art in that they possess high resistance to the action of acids and balanced expansion coefficients, without undue elevation of the maturing temperature. When alumina is present in proper proportion with the other ingredients comprising my new and improved flux compositions, the resulting glazes ordinarily mature at temperatures below 700° C. and possess coefficients of expansion such that they can be readily adjusted to match those of the usual chinaware glazes. It may be remarked that suitable expansion coefficients are fully as important as resistance to chemical agents, since with the usual types of overglaze colors such as those described in the Hainbach reference volume, the balance of the components present in the flux is such that it is impossible to secure perfect matching of expansion coefficients without departing from a practical working range of compositions.

In addition to alumina, my improved low-melting flux compositions will contain the oxides of lead, silicon, and boron. I have found that adjustment of the four essential oxidic ingredients within certain specified ranges is essential in order to prepare fluxes having the superior properties enumerated. For this reason the basic composition of my new and improved low-melting fluxes should be as follows:

|  | Per cent |
| --- | --- |
| Lead oxide (PbO) | 40–50 |
| Silica ($SiO_2$) | 15–36 |
| Alumina ($Al_2O_3$) | 5–15 |
| Boric oxide ($B_2O_3$) | 7–28 |

It should of course be understood that other ingredients in addition to those specified may be present in the new compositions. When minimum solubility of lead in fruit or food acids is required in the overglaze, it is preferable to restrict the maximum amount of boric oxide so that it does not exceed 15%.

The basic oxidic ingredients enumerated above may be secured from any suitable source such as those commonly utilized in the preparation of ceramic compositions to yield the desired oxides. The selection of the source of the oxide is not an essential feature of my invention.

In practice, the ingredients selected to yield the oxides enumerated in the desired percentage range are mixed and melted in a suitable furnace to a clear and substantially homogeneous glass. The melt is then quenched in water, in accordance with the usual practice employed in preparing low-melting fluxes for use with overglaze colors. The frit thus obtained is milled to the customary fineness, together with such additions of pigments or opacifiers as are needed to produce the desired shade of color and desired opacity. The pigments and opacifiers employed may be the usual ones now known to the ceramic art, my invention not depending in any way on the selection of specific pigments or opacifiers.

In practice it is frequently desirable to have present in the low-melting flux, in addition to the four oxides specified above as comprising my basic composition, other ingredients. Thus, one or more of the alkali metal oxides may be present. I have found that sodium oxide, $Na_2O$, may be present in amounts up to 3%; lithium oxide, $Li_2O$, may be present in amounts up to 1.5%; and potassium oxide, $K_2O$, may be present in amounts up to 3.5% with benefit to the resulting flux. Best results and glazes of most superior properties seem to result when a mixture of the oxides of lithium and potassium in the percentage ranges specified is present. It should be noted, however, that other alkali metal oxides may be present, or the alkali metal oxides may be omitted entirely. They may be present in percentages other than those specified, since these ranges are merely preferred ranges found valuable in producing outstandingly superior and commercially advantageous flux compositions. Generally the presence of an alkali metal oxide serves to bring about a reduction in the melting point, and the alkali metal oxides are frequently present for this purpose in glaze compositions of the low-melting type.

In order to render the overglaze flux compositions more compatible with some particular chemical types of pigments, I have sometimes found it desirable to incorporate other ingredients in the low-melting flux. Thus one of the oxides of zirconium, titanium, or cadmium, or mixtures of these oxides, in amounts up to 2%, may frequently constitute valuable ingredients serving to render an overglaze flux and a particular ceramic pigment more compatible. Cadmium oxide is valuable in rendering the flux compatible with a pigment of the cadmium sulfoselenide type, this property of cadmium oxide being already disclosed in the patent literature.

As specific examples of my new and improved low-melting flux compositions suitable for preparing overglaze colors, Table I lists six flux compositions. The proportions given in this table are calculated compositions. Table II lists the specific ingredients and the proportions in which these ingredients are present which, upon melting, will produce the calculated compositions of Table I. Thus Table I lists the calculated compositions, while Table II gives the batch compositions necessary to produce the fluxes upon melting. For convenience the low-melting fluxes or glazes are designated in both tables by the letters A to F inclusive.

TABLE I

*Calculated composition*

| Ingredient | Low-melting flux composition | | | | | |
| --- | --- | --- | --- | --- | --- | --- |
|  | A | B | C | D | E | F |
| $B_2O_3$ | 9.8 | 10.4 | 19.8 | 10.8 | 27.8 | 19.2 |
| $SiO_2$ | 36.1 | 32.1 | 27.2 | 30.3 | 14.8 | 23.7 |
| $Al_2O_3$ | 5.7 | 6.1 | 5.8 | 6.3 | 12.2 | 15.0 |
| PbO | 45.0 | 47.9 | 45.4 | 49.7 | 42.1 | 38.6 |
| $Na_2O$ | 0.2 | 0.2 |  | 0.3 | 0.2 | 0.2 |
| $Li_2O$ | 0.5 | 0.5 |  | 0.5 | 0.4 | 0.4 |
| $K_2O$ | 1.7 | 1.8 |  |  |  |  |
| $ZrO_2$ | 1.0 | 1.0 |  | 1.1 | 0.9 | 0.8 |
| $TiO_2$ |  |  |  | 1.0 |  |  |
| CdO |  |  | 1.8 |  | 1.6 | 1.5 |

TABLE II

*Batch compositions necessary to produce calculated compositions of Table I*

| Ingredient | Low-melting flux composition ||||||
|---|---|---|---|---|---|---|
| | A | B | C | D | E | F |
| Boric acid ($H_3BO_3$) | 15.4 | 16.2 | 29.5 | 17.0 | 38.5 | 27.9 |
| Flint ($SiO_2$) | 25.7 | 21.7 | 17.2 | 19.8 | | 4.0 |
| Kaolin ($Al_2O_3 \cdot 2SiO_2 \cdot 2H_2O$) | 12.8 | 13.5 | 12.3 | 14.2 | 24.2 | 32.5 |
| Red lead ($Pb_3O_4$) | 41.0 | 43.2 | 39.5 | 45.3 | 33.9 | 32.4 |
| Lithium carbonate ($Li_2CO_3$) | 1.0 | 1.1 | | 1.1 | 0.8 | 0.8 |
| Potassium carbonate ($2K_2CO_3 \cdot 3H_2O$) | 2.6 | 2.7 | | | | |
| Sodium zirconium silicate (14% $Na_2O$, 29% $SiO_2$, 55% $ZrO_2$) | 1.5 | 1.6 | | 1.7 | 1.3 | 1.2 |
| Titanium oxide ($TiO_2$) | | | | 0.9 | | |
| Cadmium oxide (CdO) | | | 1.5 | | 1.3 | 1.2 |

It should be noted that in both tables all parts are by weight.

Overglaze colors can be prepared from any of these flux compositions by incorporating a ceramic pigment and/or opacifying agents. Thus, by incorporating seventeen parts of a standard lead antimonate Naples yellow ceramic pigment with eighty-three parts of flux composition "A," a typical overglaze color having the improved characteristics of my invention can be secured. The ingredients should preferably be milled in a ball mill with water for a period of approximately twenty-four hours, whereupon the overglaze color composition is filtered off and dried.

When a yellow overglaze color of this type is mixed with a suitable spray medium, for example of turpentine and damar varnish, and sprayed on glazed chinaware, firing the ware to a temperature of 700° C. will yield a decorative coating of brilliant gloss and attractive appearance. This coating has an increased resistivity to attack by chemical agents and is substantially completely free from any tendency to craze or chip.

The increased resistivity to the action of acids characteristic of my improved overglaze color compositions may be demonstrated in accordance with the standard lead solubility test method of the Whitewares Division of the U. S. Bureau of Standards. This test involves applying the glaze to the inside of an ordinary teacup, firing it, and then filling the teacup with 150 cc. of boiling 5% acetic acid. The teacup is covered and allowed to stand for thirty minutes. The quantity of lead dissolved from the color is then determined by standard procedures and forms a criterion as to the acid resistance of the glaze composition. In this empirical test a tentative standard has been established for a satisfactory overglaze composition equivalent to a solubility of two parts per million of lead in the boiling acetic acid solution. This is the test generally applied in the industry in determining acceptable high fire overglaze colors of suitable low lead solubility. The above low-melting overglaze color compositions, such as, for example, flux "A" prepared by milling with the Naples yellow ceramic pigment, have been found to have lead solubilities under the test conditions of less than two parts per million. It may be remarked that this extremely low figure has never before been obtained with low fire overglaze colors.

The tendency of an overglaze composition to craze or chip is usually determined by observation. It may be accelerated by placing the decorated ware in a steam autoclave at a temperature of approximately 180° C. for one hour. By frequently repeating this test and examining the glaze, any tendency to craze or chip can be readily observed. The detection of crazing is facilitated by wetting the surface with ink and then wiping the ink away, this tending to show up small cracks in the glaze composition which are not otherwise visible to the naked eye. Proneness to crazing or chipping in the glaze composition is greatly increased when the glaze is applied in greater thickness to the base surface. The improved low fire overglaze color compositions described show no crazing or chipping tendencies even when applied to the base material in a layer so thick as to constitute virtually a relief coating.

It will be apparent that while I have described certain improved embodiments of my improved glaze compositions, suitable for use in overglazing, many changes and modifications may be made in the preferred embodiments disclosed without departing from the spirit or scope of my invention. Accordingly, the scope of my invention is to be construed in accordance with the prior art and appended claims, and is not to be restricted to proportions and conditions which have been referred to merely as illustrative of these preferred embodiments.

I claim:

1. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; and alumina present in amounts ranging from 5 to 15%; all said percentages being by weight based on the total weight of said glaze composition.

2. A low-melting glaze composition, suitable for use as an overglaze, which comprises lead oxide present in amounts ranging from 40 to 50%; silica present in amounts ranging from 15 to 36%; boric oxide present in amounts ranging from 7 to 15%; and alumina present in amounts ranging from 5 to 15%; all said percentages being by weight based on the total weight of said glaze composition.

3. A low-melting glaze composition suitable for use as an overglaze which comprises lead oxide present in amounts ranging from 40 to 50%; silica present in amounts ranging from 15 to 36%; boric oxide present in amounts ranging from 7 to 28%; alumina present in amounts ranging from 5 to 15%; and at least one of the oxides of the alkali metals selected from the group consisting of sodium, lithium, and potassium; sodium oxide, when present, being present in amounts not exceeding 3%; lithium oxide, when present, being present in amounts not exceeding 1.5%; and potassium oxide when present, being present in amounts not exceeding 3.5%; all said percentages being by weight based on the total weight of said glaze composition.

4. A low-melting glaze composition, suitable for use as an overglaze, which comprises lead oxide present in amounts ranging from 40 to 50%; silica present in amounts ranging from 15 to 36%; boric oxide present in amounts ranging from 7 to 15%; alumina present in amounts ranging from 5 to 15%; and at least one of the alkali metal oxides selected from the group which consists of the oxides of sodium, lithium, and potassium; sodium oxide, when present, being present in amounts not exceeding 3%; lithium oxide, when present, being present in amounts not exceeding 1.5%; and potassium oxide, when present, being present in amounts not exceeding 3.5%; all said percentages being by weight based on the total weight of said glaze composition.

5. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; alumina present in amounts ranging from 5 to 15%; and at least one of the oxides selected from the group which consists of the oxides, of zirconium, titanium, and cadmium; said percentages being by weight based on the total weight of said glaze composition.

6. A low-melting glaze composition, suitable for use as an overglaze, which comprises lead oxide present in amounts ranging from 40 to 50%; silica present in amounts ranging from 15 to 36%; boric oxide present in amounts ranging from 7 to 15%; alumina present in amounts ranging from 5 to 15%; and at least one of the oxides selected from the group which consists of the oxides of zirconium, titanium, and cadmium; said percentages being by weight based on the total weight of said glaze composition.

7. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; alumina present in amounts ranging from 5 to 15%; at least one of the alkali metal oxides selected from the group which consists of the oxides of sodium, lithium, and potassium; sodium oxide, when present, being present in amounts not exceeding 3%; lithium oxide, when present, being present in amounts not exceeding 1.5%; potassium oxide, when present, being present in amounts not exceeding 3.5%; and at least one of the oxides selected from the group which consists of the oxides of zirconium, titanium, and cadmium; all said percentages being by weight based on the total weight of said glaze composition.

8. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; alumina present in amounts ranging from 5 to 15%; and zirconium oxide; all said percentages being by weight based on the total weight of said glaze composition.

9. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; alumina present in amounts ranging from 5 to 15%; zirconium oxide; and at least one of the alkali metal oxides selected from the group which consists of the oxides of sodium, lithium, and potassium; sodium oxide, when present, being present in amounts not exceeding 3%; lithium oxide, when present, being present in amounts not exceeding 1.5%; potassium oxide, when present, being present in amounts not exceeding 3.5%; all said percentages being by weight based on the total weight of said glaze composition.

10. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; alumina present in amounts ranging from 5 to 15%; and titanium oxide; all said percentages being by weight based on the total weight of said glaze composition.

11. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; alumina present in amounts ranging from 5 to 15%; titanium oxide; and at least one of the alkali metal oxides selected from the group which consists of the oxides of sodium, lithium, and potassium; sodium oxide, when present, being present in amounts not exceeding 3%; lithium oxide, when present, being present in amounts not exceeding 1.5%; potassium oxide, when present, being present in amounts not exceeding 3.5%; all said percentages being by weight based on the total weight of said glaze composition.

12. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; alumina present in amounts ranging from 5 to 15%; and cadmium oxide; all said percentages being by weight based on the total weight of said glaze composition.

13. A low-melting glaze composition, suitable for use as an overglaze, which comprises lead oxide present in amounts ranging from 40 to 50%; silica present in amounts ranging from 15 to 36%; boric oxide present in amounts ranging from 7 to 28%; alumina present in amounts ranging from 5 to 15%; cadmium oxide; and at least one of the alkali metal oxides selected from the group which consists of the oxides of sodium, lithium, and potassium; sodium oxide, when present, being present in amounts not exceeding 3%; lithium oxide, when present, being present in amounts not exceeding 1.5%; potassium oxide, when present, being present in amounts not exceeding 3.5%; all said percentages being by weight based on the total weight of said glaze composition.

14. A pigmented, low-melting glaze composition, suitable for use as an overglaze, which comprises a ceramic pigment and a lead frit composition, said base composition comprising: lead oxide present in amounts ranging from 40 to 50%; silica present in amounts ranging from 15 to 36%; boric oxide present in amounts ranging from 7 to 28%; and alumina present in amounts ranging from 5 to 15%; all said percentages being by weight based on the total weight of said base composition.

15. A pigmented, low-melting glaze composition, suitable for use as an overglaze, which comprises a ceramic pigment and a lead frit base composition, said base composition comprising: lead oxide present in amounts ranging from 40 to 50%; silica present in amounts ranging from 15 to 36%; boric oxide present in amounts ranging from 7 to 15%; and alumina present in amounts ranging from 5 to 15%; all said percentages being by weight based on the total weight of said base composition.

16. A pigmented, low-melting glaze composition, suitable for use as an overglaze, which comprises a ceramic pigment and a lead frit base composition, said base composition comprising: lead oxide present in amounts ranging from 40 to 50%; silica present in amounts ranging from 15 to 36%; boric oxide present in amounts ranging from 7 to 28%; alumina present in amounts ranging from 5 to 15%; and at least one of the alkali metal oxides selected from the group which consists of sodium oxide, lithium oxide, and potassium oxide; sodium oxide, when present, being present in amounts not exceeding 3%; lithium oxide, when present, being present in amounts not exceeding 1.5%; and potassium oxide, when present, being present in amounts not exceeding 3.5%; all said percentages being by weight based on the total weight of said base composition 17. A pigmented, low-melting glaze composition, suitable for use as an overglaze, which comprises a ceramic pigment and a lead frit base composition, said base composition comprising: lead oxide present in amounts ranging from 40 to 50%; silica present in amounts ranging from 15 to 36%; boric oxide present in amounts ranging from 7 to 28%; alumina present in amounts ranging from 5 to 15%; at least one of the alkali metal oxides selected from the group which consists of sodium oxide, lithium oxide, and potassium oxide; sodium oxide, when present, being present in amounts up to 3%; lithium oxide, when present, being present in amounts up to 1.5%; potassium oxide, when present, being present in amounts up to 3.5%; and at least one of the metal oxides selected from the group which consists of zirconium oxide, titanium oxide, and cadmium oxide; all said percentages being by weight based on the total weight of said base composition.

18. A chinaware article coated with the decorative glaze composition of claim 1.

19. A chinaware article coated with the decorative glaze composition of claim 14.

ALDEN J. DEYRUP.